(12) United States Patent
Wang

(10) Patent No.: US 10,973,063 B2
(45) Date of Patent: Apr. 6, 2021

(54) DATA FORWARDING METHOD AND DEVICE, NETWORK FUNCTION ENTITY, AND SESSION MANAGEMENT FUNCTION ENTITY

(71) Applicant: CHINA ACADEMY OF TELECOMMUNICATIONS TECHNOLOGY, Beijing (CN)

(72) Inventor: Hucheng Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/618,322

(22) PCT Filed: May 21, 2018

(86) PCT No.: PCT/CN2018/087636
§ 371 (c)(1),
(2) Date: Nov. 29, 2019

(87) PCT Pub. No.: WO2018/228137
PCT Pub. Date: Dec. 20, 2018

(65) Prior Publication Data
US 2020/0383151 A1    Dec. 3, 2020

(30) Foreign Application Priority Data

Jun. 15, 2017   (CN) .......................... 2017 1 0453889
Jun. 16, 2017   (CN) .......................... 2017 1 0458659

(51) Int. Cl.
*H04W 76/12*   (2018.01)
*H04W 28/02*   (2009.01)
(Continued)

(52) U.S. Cl.
CPC ....... *H04W 76/12* (2018.02); *H04W 28/0268* (2013.01); *H04W 36/0022* (2013.01); *H04W 36/0033* (2013.01); *H04W 36/14* (2013.01)

(58) Field of Classification Search
None
See application file for complete search history.

(56) References Cited

U.S. PATENT DOCUMENTS

2011/0188379 A1   8/2011   Calippe et al.
2011/0188457 A1   8/2011   Shu et al.
(Continued)

FOREIGN PATENT DOCUMENTS

CN   102771095 A   11/2012
CN   102771155 A   11/2012
(Continued)

OTHER PUBLICATIONS

International Search Report for PCT/CN2018/087636 dated Aug. 22, 2018 and its English translation provided by WIPO.
(Continued)

*Primary Examiner* — Saumit Shah
(74) *Attorney, Agent, or Firm* — Ladas & Parry, LLP

(57) ABSTRACT

A data forwarding method includes: acquiring a mapping between EPS bearer information and PDU session information; and transmitting the snapping between the EPS bearer information and the PDU session in formation to the SMF entity, so that the SMF entity configures a data forwarding tunnel in accordance with the mapping between the EPS bearer information and the PDU session information.

6 Claims, 10 Drawing Sheets

(51) Int. Cl.
*H04W 36/00* (2009.01)
*H04W 36/14* (2009.01)

(56) References Cited

U.S. PATENT DOCUMENTS

| | | | |
|---|---|---|---|
| 2018/0109353 A1 | 4/2018 | Kwak et al. | |
| 2020/0077315 A1* | 3/2020 | Jin | H04W 36/00 |
| 2020/0092780 A1* | 3/2020 | Koshimizu | H04W 36/36 |
| 2020/0112522 A1* | 4/2020 | Dannebro | H04W 36/14 |

FOREIGN PATENT DOCUMENTS

| | | |
|---|---|---|
| CN | 103118401 A | 5/2013 |
| CN | 106851856 A | 6/2017 |
| WO | 2016208991 A1 | 12/2016 |
| WO | 2018128494 A1 | 7/2018 |

OTHER PUBLICATIONS

Written Opinion of the International Searching Authority for PCT/CN2018/087636 dated Aug. 22, 2018and its English translation provided by WIPO.
First Office Action and search report from CN app. No. 201710458659.5, dated Mar. 20, 2020, with English translation provided by Global Dossier.
Extended European Search Repot from EP app. No. 18818163.0, dated Mar. 23, 2020.
International Preliminary Report on Patentability from PCT/CN2018/087636, dated Dec. 17, 2019, with English translation from WIPO.
3$^{rd}$ Generation Partnership Project; Technical Specification Group Services and System Aspects; Procedures for the 5G System; Stage 2 (Release 15), 3GPP TS 23.502, V04.0 (May 2017).
"TS 23.502 P-CR to handover from EPS to NGS", S2-172154, SA WG2 Meeting #120, Mar. 27-31, Busan, Korea.
"TS 23.502: Discussion on EPS bearer ID allocation during Inter-RAT handover from 5GS to EPS", S2-172175, SA WG2 Meeting #120, Mar. 27-31, Busan, Korea.
Notice of Reasons for Refusal from JP app. No. 2019-569441, dated Jan. 19, 2021, with English translation from Global Dossier.
Notification of Reason for Refusal from KR app. No. 10-2020-7001216, dated Dec. 4, 2020, with English translation from Global Dossier.
"23.502: QoS mapping for 5GC-EPC interworking", S2-171962, 3GPP TSG SA WG2 Meeting #120, Busan, Korea, Mar. 27-31, 2017.
"23.501: S-Nssai to NSI relationship and introduction of the Core Network Slice instance Identifier", S2-173206, SA WG2 Meeting #121, Hangzhou, China, May 15-19, 2017.
"Single Registration-based handover from EPS to 5GS procedure", S2-173317, SA WG2 Meeting #121, Hangzhou, China, May 15-19, 2017.
"TS 23.502: Registration procedure changes for EPS to NGS idle mode mobility with NX Interface", S2-173318, SA WG2 Meeting #120, Hangzhou, China, May 15-19, 2017.
"Allocation of EPS bearer IDS in 5GS", S2-173322, SA WG2 Meeting #121, Hangzhou, China, May 15-19, 2017.

* cited by examiner

DATA FORWARDING METHOD AND DEVICE, NETWORK FUNCTION ENTITY, AND SESSION MANAGEMENT FUNCTION ENTITY

CROSS-REFERENCE TO RELATED APPLICATIONS

The present application is the U.S. national phase of PCT/CN2018/087636 filed on May 21, 2018 which claims priorities to the Chinese patent application No. 201710453889.2 filed on Jun. 15, 2017 and the Chinese patent application No. 201710458659.5 filed on Jun. 16, 2017, the disclosures of which are incorporated by reference herein in their entireties.

TECHNICAL FIELD

The present disclosure relates to the field of communication technology, in particular to a data forwarding method, a data forwarding device, a network function entity and a Session Management Function (SMF) entity.

BACKGROUND

Currently, in order to ensure normal operation of a $5^{th}$-Generation (5G) mobile communication system, it is necessary for a 5G network to support interoperation with a Long Term Evolution (LTE) network using a universal mobile communication technique. In a single-registration interoperation mode, an inter-Radio Access Technique (RAT) switching operation is capable of being performed by a User Equipment (UE) between the 5G network and the UE network. In a switching process, a data transmission mode of the 5G network is different from that of the LTE network, so when forwarding the data between different systems, a core network function entity supporting a data forwarding function is required to be capable of correctly mapping data received from one system to a transmission path for another system. In a conventional interoperation scheme, a Public Data Network Gateway User Plane (PGW-U)+User Plane Function (UPF) entity that supports PGW-U and UPF simultaneously is adopted to forward the data. However, the routing the forwarded data to the PGW-U+UPF entity leads to redundant data muting and an increase in a time delay for the data forwarding.

Currently, in an interoperating scenario with the 5G network and the LTE network, the PGW-U+UPF entity serves as a data forwarding node. The data issued by an anchor point for a session is required to be routed back to the anchor point, and then forwarded to a target base station. Hence, the conventional data forwarding method in the interoperating scenario leads to the redundant forwarded data, a large time delay for forwarding the data, and low data forwarding efficiency, especially in a roaming scenario where home routing is adopted.

SUMMARY

An object of the present disclosure is to provide a data forwarding method, a data forwarding device, a network function entity, and an SMF entity; so as to prevent the occurrence of redundant forwarded data and a large time delay for forwarding the data in the convention as compared with, the conventional data forwarding method in the interoperating scenario.

In one aspect, the present disclosure provides in some embodiments a data forwarding method for a network function entity, including: acquiring a mapping between Evolved Packet System (EPS) hearer information and Protocol Data Unit (PDU) session information and transmitting the mapping between the EPS bearer information and the PDU session information to an SMF entity, so that the SMF entity configures a data forwarding tunnel in accordance with the mapping between the EPS bearer information and the PDU session information.

In some possible embodiments of the present disclosure, subsequent to acquiring the mapping between the EPS bearer information and the PDU session information, the data forwarding method further includes determining the SMF entity for forwarding data.

In some possible embodiments of the present disclosure, the network function entity is an Access and Mobility Management Function (AMP) entity or a Public Data Network Gateway Control Plane (PGW-C)+SMF entity.

In some possible embodiments of the present disclosure, when the data is forwarded from a 5G system to an LTE system, the acquiring the mapping between the EPS bearer information and the PDU session information includes acquiring a mapping between Identities (IDs) of EPS bearers that need to receive the forwarded data and IDs of Quality of Service (QoS) flows for PDU sessions.

In some possible embodiments of the present disclosure, the network function entity is an AMP entity, and prior to acquiring the mapping between the IDs of the EPS bearers that need to receive the forwarded data and the IDs of the QoS flows for the PDU sessions, the data forwarding method further includes acquiring an ID of an EPS bearer that needs to receive the forwarded data from a Mobility Management Entity (MME).

In some possible embodiments of the present disclosure, prior to acquiring the ID of the EPS hearer that needs to receive the forwarded data from the MME, the data forwarding method farther includes providing IDs of candidate EPS bearers that need to receive the forwarded data to the MME.

In some possible embodiments of the present disclosure, prior to providing the IDs of the candidate EPS bearers that need to receive the forwarded data to the MME, the data forwarding method farther includes: acquiring an ID of a QoS flow for a PDU session for which the data needs to be forwarded from a New Generation (NG) Radio Access Network (RAN) of the 5G system; acquiring the mapping between the IDs of the QoS flows for the PDU sessions and the IDs of the EPS bearers from the PGW-C+SMF entity; and determining the IDs of the candidate EPS bearers that need to receive the forwarded data corresponding to the ID of the QoS flow for, the PDU session for which the data needs to be forwarded in accordance with the mapping between the IDs of the QoS flows for the PDU sessions and the IDs of the EPS bearers.

In some possible embodiments of the present disclosure, when the data is forwarded from the LTE system to the 5G system, the acquiring the mapping between the EPS bearer information and the PDU session information includes acquiring a mapping among IDs of the PDU sessions that need to receive the forwarded data, IDs of related QoS flows for the PDU session and the IDs of the EPS bearers.

In some possible embodiments of the present disclosure, the network function entity is an AMF entity, and prior to acquiring the mapping among the IDs of the PDU sessions that need to receive the forwarded data, the IDs of the related QoS flows for the PDU sessions and the IDs of the EPS bearers, the data forwarding method further includes acquiring the ID of the QoS flow for the PDU session that needs to receive the forwarded data from the NG RAN of the 5G system.

In some possible embodiments of the present disclosure, prior to acquiring, the ID of the QoS flow for the PDU session that needs to receive the forwarded data from the NG RAN of the 5G system, the data forwarding method further includes providing IDs of QoS flows for candidate PDU sessions that need to receive the forwarded data to the NG RAN.

In some possible embodiments of the present disclosure, prior to providing the IDs of the QoS flows for the candidate PDU sessions that need to receive the forwarded data to the NG RAN, the data forwarding method further includes: acquiring the ID of the EPS bearer that needs to forward the data from the MME; and determining the IDs of the QoS flows for the candidate PDU sessions that need to receive the forwarded data in accordance with the ID of the EPS bearer that needs to forward the data.

In some possible embodiments of the present disclosure, the determining the SMF entity for forwarding the data includes determining the SMF entity for forwarding the data in accordance with position information about a UE and/or PDU session information related to data forwarding. A PDU session related to data forwarding is a PDU session for which the data needs to be forwarded, or a PDU session corresponding to the EPS bearer for which the data needs to be forwarded. The PDU session information includes at least one of a Data Network Name (DNN) corresponding to the PDU session and information about a network slice to which the PDU session belongs.

In some possible embodiments of the present disclosure, the network function entity is a PGW-C+SMF entity, and the determining the SMF entity for forwarding the data includes: receiving a request message from the AMF entity; and determining the SMF entity for forwarding the data in accordance with the request message.

In another aspect, the present disclosure provides in some embodiments a data forwarding method for an SMF entity, including: receiving a mapping between EPS bearer information and PDU session information from an AMF entity or a PGW-C+SMF entity; and configuring a data forwarding tunnel in accordance with the mapping between the EPS bearer information and the PDU session information.

In some possible embodiments of the present disclosure, when data is forwarded from a 5G system to an LTE system, the mapping between the EPS bearer information and the PDU session information is a mapping between IDs of EPS bearers that need to receive the forwarded data and IDs of QoS flows for PDU sessions. The configuring the data forwarding tunnel in accordance with the mapping between the EPS bearer information and the PDU session information includes: selecting an UPF entity; allocating a core network tunnel ID for forwarding the data to a PDU session, and configuring a forwarding tunnel between the UPF entity and a Serving Gateway (SGW) for forwarding the data and a PDU session tunnel between the UPF entity and an NG RAN of the 5G system; and binding a QoS flow for the PDU session to the forwarding tunnel corresponding to the EPS bearer that needs to receive the forwarded data, so that the UPF entity is capable of forwarding a data packet to a correct EPS bearer forwarding tunnel in accordance with an ID of a QoS flow for the data packet.

In some possible embodiments of the present disclosure, when the data is forwarded from the LTE system to the 5G system, the mapping between the EPS bearer information and the PDU session information is a mapping among IDs of the PDU sessions that need to receive, the forwarded data, IDs of related QoS flows for the PDU sessions and the IDs of the EPS bearers. The configuring the data forwarding tunnel in accordance with the mapping between the EPS bearer information and the PEW session information includes: selecting an UPF entity; allocating a Tunnel Endpoint Identity (TEID) for forwarding the data to an EPS bearer, and configuring a PDU session tunnel between the UPF entity and the NG RAN of the 5G system; and binding the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

In yet another aspect, the present disclosure provides in some embodiments a data forwarding device for a network function entity, including; a first acquisition module configured to acquire a mapping between EPS bearer information and PDU session information; a determination module configured to determine an SMF entity for forwarding data; and a first transmission module configured to transmit the mapping between the EPS bearer information and the PDU session information to the SMF entity, so that the SMF entity configures a data forwarding tunnel in accordance with the mapping between the EPS bearer information and the PDU session information.

In some possible embodiments of the present disclosure, the network function entity is an AMP entity or a PGW-C+SMF entity.

In some possible embodiments of the present disclosure, when the data is forwarded from a 5G system to an LTE system, the first acquisition module is further configured to acquire a mapping between IDs of EPS bearers that need to receive the forwarded data and IDs of QoS flows for PDU sessions.

In some possible embodiments of the present disclosure, the network function entity is an AMF entity, and the data forwarding device further includes a second acquisition module configured to acquire an ID of an EPS bearer that needs to receive the forwarded data from an MME.

In some possible embodiments of the present disclosure, the data forwarding device further includes a second transmission module configured to provide IDs of candidate EPS bearers that need to receive the forwarded data to the MME.

In some possible embodiments of the present disclosure, the data forwarding device further includes: a third acquisition module configured to acquire an ID of a QoS flow for a PDU session for which the data needs to be forwarded from an NG RAN of the 5G system; a four acquisition module configured to acquire the mapping between the IDs of the QoS flows for the PDU sessions and the IDs of the EPS bearers from the PGW-C+SMF entity: and a first determination module configured to determine the IDs of the candidate EPS bearers that need to receive the forwarded data corresponding to the ID of the QoS flow for the PDU session for which the data needs to be forwarded in accordance with the mapping between the IDs of the QoS flows for the PDU sessions and the IDs of the EPS bearers.

In some possible embodiments of the present disclosure, when the data is forwarded from the LTE system to the 5G system, the first acquisition module is further configured to acquire a mapping among IDs of the PDU sessions that need to receive the forwarded data, IDs of related QoS flows for the PDU session and the IDs of the EPS bearers.

In some possible embodiments of the present disclosure, the network function entity is an AMF entity, and the data forwarding device thriller includes a fifth acquisition module configured to acquire the ID of the QoS flow for the PDU session that needs to receive the forwarded data from the NG RAN of the 5G system.

In some possible embodiments of the present disclosure, the data forwarding device further includes a third transmission module configured to provide IDs of QoS flows for candidate PDU sessions that need to receive the forwarded data to the NG RAN.

In some possible embodiments of the present disclosure, the data forwarding device further includes; a sixth acquisition module configured to acquire the ID of the EPS bearer that needs to forward the data from the MME; and a second determination module configured to determine the IDs of the QoS flows for the candidate PDU sessions that need to receive the forwarded data in accordance with the ID of the EPS bearer that needs to forward the data.

In some possible embodiments of the present disclosure, the determination module is further configured to determine the SMF entity for forwarding the data in accordance with position information about a UE and/or PDU session information related to data forwarding. A PDU session related to data forwarding is a PDU session for which the data needs to be forwarded, or a PDU session corresponding to the EPS bearer for which the data needs to be forwarded. The PDU session information includes at least one of a Data Network Name (DNN) corresponding to the PDU session and information about a network slice to Which the PDU session belongs.

In some possible embodiments of the present disclosure, the network function entity is a PGW-C+SMF entity, and the determination module is further configured to: receive a request message from the AMP entity; and determine the SMF entity for forwarding the data in accordance with the request message.

In still yet another aspect, the present disclosure provides in some embodiments a data forwarding device for an SMF entity, including: a reception module configured to receive a mapping between EPS bearer information and PDU session information from an AMF entity or a PGW-C+SMF entity; and a configuration module configured to configure a data forwarding tunnel in accordance with the EPS bearer information and the PDU session information.

In some possible embodiments of the present disclosure, when data is forwarded from a 5G system to an LTE system, the mapping between the EPS bearer information and the PDU session information is a mapping between IDs of EPS bearers that need to receive the forwarded data and IDs of QoS flows for PDU sessions. The configuration module includes: a first selection unit configured to select an UPF entity; a first configuration unit configured to allocate a core network tunnel. ID for forwarding the data to a PDU session, and configure a forwarding tunnel between the UPF entity and an SGW for forwarding the data and a PDU session tunnel between the UPF entity and an NG RAN of the 5G system; and a first binding unit configured to bind a QoS flow for the PDU session to the forwarding tunnel corresponding to the EPS bearer that needs to receive the forwarded data, so that the UPF entity is capable of forwarding a data packet to a correct EPS bearer forwarding tunnel in accordance with an ID of a QoS flow for the data packet.

In some possible embodiments of the present disclosure, when the data is forwarded from the LTE system to the 5G system, the mapping between the EPS bearer information and the PDU session information is a mapping among IDs of the PDU sessions that need to receive the forwarded data, IDs of related QoS flows for the PDU sessions and the IDs of the EPS hearers. The configuration module includes: a second selection unit configured to select an UPF entity; a second configuration unit configured to allocate a TEID for forwarding the data to an EPS bearer, and configure a PDU session tunnel between the UPF entity and the NG RAN of the 5G system; and a second binding unit configured to bind the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

In still yet another aspect, the present disclosure provides in some embodiments a network function entity, including a memory, a processor, and a computer program stored in the memory and executed by the processor. The processor is configured to execute the computer program so as to implement the above-mentioned data forwarding method.

In still yet another aspect, the present disclosure provides in some embodiments an SMF entity, including a memory, a processor, and a computer program stored in the memory and executed by the processor. The processor is configured to execute the computer program so as to implement the above-mentioned data forwarding method.

In still yet another aspect, the present disclosure provides in some embodiments a computer-readable storage medium storing therein a computer program. The computer program is executed by a processor so as to implement the above-mentioned data forwarding method.

In still yet another aspect, the present disclosure provides in some embodiments a computer-readable storage medium storing therein a computer program. The computer program is executed by a processor so as to implement the above-mentioned data forwarding method.

According to the data forwarding method in the embodiments of the present disclosure, the mapping between the EPS bearer information and the VDU session information may be acquired, the SMF entity for forwarding the data may be determined, and then the mapping between the EPS bearer information and the PDU session information May be transmitted to the SMF entity, so that the SMF entity may configure the data forwarding tunnel in accordance with the mapping between the EPS bearer information and the PDU session information. As a result, it is able to prevent the use of a PGW-U+UPF entity as a data forwarding node, thereby to prevent the occurrence of redundant forwarded data, reduce the time delay for forwarding the data, and improve the data transmission efficiency.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and, based on these drawings, a person skilled in the art may obtain the other drawings without any creative effort.

DETAILED DESCRIPTION

Figure 1:
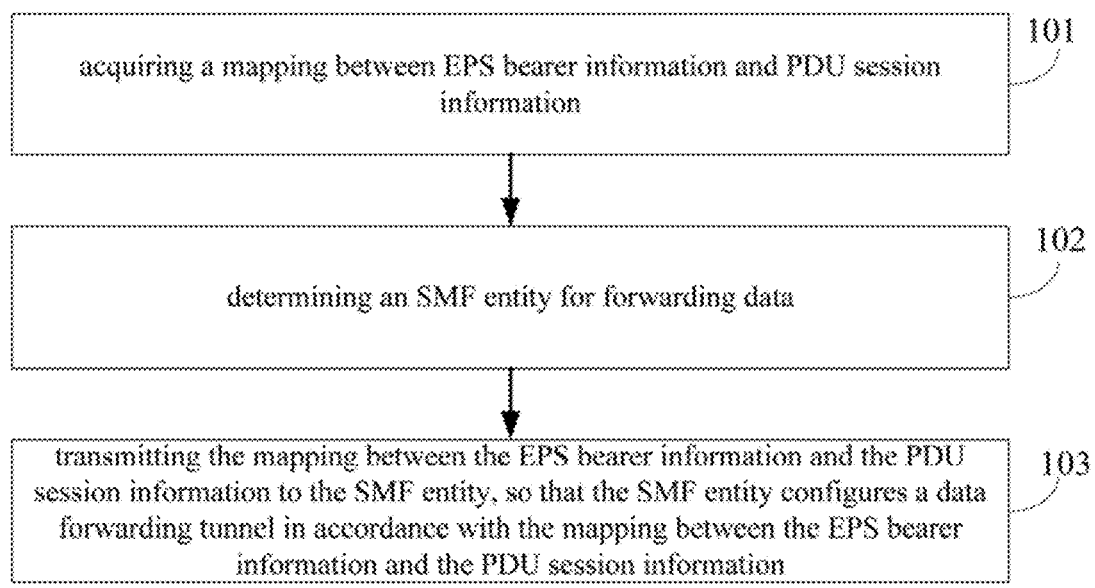
FIG. 1 is a flow chart of a data forwarding method according to some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In network architecture supporting the interoperation of a 5G network with an LTE network, an Nx interface between an MME in the LTE network and an AMF entity in the 5G network is supported optionally. When the Nx interface is supported, it is able to switch between the 5G network and the LTE network. At this time, it is necessary to transmit context information about a UE between the MME and the AMF entity, and the context information includes a mobility context and a session connection context. When the UE accesses to the network supporting the Nx interface, the network may probably configure its registration mode as a single registration mode. Currently, the single registration mode is an operating mode which is required to be supported by the UE forcibly.

A handover procedure from the 5G network to the LTE network in the single registration mode mainly includes the following steps.

S1: upon the receipt of a handover request from an RAN, the AMP entity may request each S1 entity to return an EPS bearer context generated through mapping a PDU session context.

S2: upon the receipt of the EPS bearer context from each SMF entity, the AMP entity may generate a UP context in accordance with the mobility context, and transmit the UP context to the MME via the Nx interface.

S3: a target-side MME may consider the Nx interface as an S10 interface, i.e., consider the AMF entity as an MME. Upon the receipt of the UE context via the Nx interface, the target-side MME may continue to perform a subsequent procedure in accordance with an S1 handover procedure for a conventional EPS system.

S4: when the SMF entity/the PGW-C entity determines that the session for the UP has been switched to the LTE network, it may probably initiate a dedicated bearer activation process so as to establish a dedicated bearer for some non-ORB QoS flows.

A handover preparation procedure from the LTE network to the 5G network in the single registration mode mainly includes the following steps.

S1: upon the receipt of a handover request from an evolved Universal Mobile Telecommunications System (UMTS) Terrestrial Radio Access Network (E-UTRAN), the MME may determine a target AMP entity, and transmit the EPS bearer context to the AMP entity.

S2: Upon the receipt of a request from the MME, the AMP entity may convert EPS mobility management context to 5GS mobility management context. The UP context provided by the MME includes an EPS bearer context, and the EPS bearer context includes an address of a PGW-C+SMF entity and uplink tunnel information about the PGW-U+UPF entity.

S3: the AMP entity may transmit a request message to the PGW-C+SMF entity, so as to request the PGW-C+SMF entity to return such information as an ID of a PDU session, QoS rules, and an EPS bearer list.

S4: the AMF entity may transmit a handover request to an NG RAN of the 5G network, so as to request the establishment of an air-interface bearer.

S5: The NG RAN may return an Acknowledgement (ACK) message to the AMP entity, and RAN-side tunnel information about an N3 interface for forwarding data is carried in the ACK message.

S6: the AMP entity may transmit a request message to the PGW-C+SMF entity, and the RAN-side tunnel information about the N3 interface for forwarding the data is carried in the request message.

S7: The PGW-C+SMF entity may return the ID of the PDU session and the EPS bearer list to the AMP entity. The EPS bearer list includes information about bearers established in the 5G system, and core network tunnel information about bearers through which the data needs to be forwarded.

S8: the AMP entity may return a response message to the MME, and the EPS bearer list is carried in the response message, so that the MME entity may request an SGW to create a forwarding tunnel in accordance with the core network tunnel information about the bearers through which the data needs to be forwarded in the EPS bearer list.

Currently, in an interoperating scenario with the 5G network and the LTE network, the PGW-U+UPF entity serves as a data forwarding node. The data issued by an anchor point for a session is required to be routed back to the anchor point, and then forwarded to a target base station. Hence, the conventional data forwarding method in the interoperating scenario leads to the redundant forwarded data, a large time delay for forwarding the data, and low data forwarding efficiency, especially in a roaming scenario where home routing is adopted.

As shown in FIG. 1, the present disclosure provides in some embodiments a data forwarding method for a network function entity, which includes the following steps.

Step 101: acquiring a mapping between EPS bearer information and PDU J session information.

In the embodiments of the present disclosure, the network function entity may be an AMP entity, or a PGW-C+SMF entity capable of supporting a PGW-C function and an anchoring SMF simultaneously.

The data forwarding method in the embodiments of the present disclosure may be applied to an interoperating scenario with a 5G network and an LTE network. Data may be forwarded from a 5G system to an LTE system, or from the LTE system to the 5G system. When the data is forwarded from the 5G system to the LTE system, the acquiring the mapping between the EPS bearer information and the PDU session information may include acquiring a mapping between IDs of EPS bearers that need to receive the forwarded data and IDs of QoS flows for PDU sessions. In addition, when the data is forwarded from the 5G system to the LTE system, the acquiring the mapping between the EPS bearer information and the PDU session information may further include acquiring a mapping between the IDs of the EPS bearers and the IDs of the QoS flows for the PDU sessions for which the data needs to be forwarded.

When the data is forwarded from the LTE system to the 5G system, the acquiring the mapping between the EPS bearer information and the PDU session information may include acquiring a mapping among IDs of PDU sessions that need to receive the forwarded data. IDs of related QoS flows for the PDU sessions, and the IDs of the EPS bearers. In addition, when the data is forwarded from the LTE system to the 5G system, the acquiring the mapping between the EPS bearer information and the PDU session information may include acquiring a mapping among the IDs of the EPS bearers for which the data need s to be forwarded, IDs of the PDU sessions and the IDs of the related QoS flows for the PDU sessions.

Step 102: determining an SMF entity for forwarding the data.

The SMF entity determined in Step 102 may be an intermediate SMF entity. The network function entity may determine the SMF entity for forwarding the data in accordance with position information about a UE and/or PDU session information related to data forwarding.

To be specific, in the embodiments of the present disclosure, Step 102 may include determining the SMF entity for forwarding the data in accordance with the position information about the UE and/or the PDU session information related to data forwarding.

A PDU session related to data forwarding may be a PDU session for which the data needs to be forwarded, or a PDU session corresponding to an EPS bearer for which the data needs to be forwarded. The PDU session information may include at least one of a DNN corresponding to the PDU session and information about a network slice to which the PDU session belongs.

In the embodiments of the present disclosure, when the network function body is the PGW-C+SMF entity, the determining, by the PGW-C+SMG entity, the SMF entity for forwarding the data may include: receiving a request message from the AMF entity; and determining the SMF entity for forwarding the data in accordance with the received request message.

During the implementation, when the UE is in a non-roaming state, i.e., in a home network, the determined. SMF entity for forwarding the data may be the PGW-C+SMF entity. At this time, the step of transmitting the mapping between the EPS bearer information and the PDU session information to the PGW-C+SMF entity may be omitted. In addition, when the UE is in a roaming state, i.e., in a visited network, the determined SMF entity for forwarding the data may be a conventional visitor SMF (V-SMF) entity serving the PDU session.

Step 103: transmitting the mapping between the EPS bearer information and the PDU session information to the SMF entity, so that the SMF entity configures a data forwarding tunnel in accordance with the mapping between the EPS bearer information and the PDU session information.

When the mapping between the EPS bearer information and the PDU session information is the mapping between the IDs of the EPS bearers that need to receive the forwarded data and the IDs of the QoS flows for the PDU sessions, the SMF entity may configure the data forwarding tunnel as follows. The SF entity may select an UPF entity at first, allocate a core network tunnel ID for forwarding the data to each PDU session, configure a forwarding tunnel between the UPF entity and, an SGW for forwarding the data and a PDU session tunnel between the UPF entity and an NG RAN of the 5G system, and then bind the QoS flow for each PDU session to a forwarding tunnel corresponding to the EPS bearer that needs to receive the forwarded data in accordance with the mapping between the IDs of the EPS bearers that need to receive the forwarded data and the IDs of the QoS flows for the PDU sessions, so that the UPF entity is capable of forwarding a data packet to a correct. EPS bearer forwarding tunnel in accordance with an ID of a QoS flow for the data packet.

When the mapping between the EPS bearer information and the PDU session information is the mapping among the IDE of the PDU sessions that need to receive the forwarded data, the IDs of the related QoS flows for the PDU sessions and the IDs of the EPS bearers, the SMF entity may configure the data forwarding tunnel as follows. The SMF entity may select an UPF entity at first, allocate a TEID for forwarding the data to each EPS bearer, configure a PDU session tunnel between the UPF entity and the NG RAN of the 5G system, and then bind the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received through the EPS bearer tunnel with a correct ID of QoS flow, and forwarding the data packet to a correct PDU session forwarding tunnel.

According to the data forwarding method in the embodiments of the present disclosure, the mapping between the EPS bearer information and the PDU session information may be acquired, the SMF entity for forwarding the data may be determined, and then the mapping between the EPS bearer information and the PDU session information may be transmitted to the SMF entity, so that the SMF entity may configure the data forwarding tunnel in accordance with the mapping between the EPS bearer information and the PDU session information. As a result, it is able to prevent the use of a PGW-U+UPF entity as a data forwarding node, thereby to prevent the occurrence of redundant forwarded data, reduce the time delay for forwarding the data, and improve the data transmission efficiency.

In the embodiments of the present disclosure, when the mapping between the EPS bearer information and the PDU session information is the mapping between the IDs of the EPS bearers that need to receive the forwarded data and the IDs of the QoS flows for the PDU sessions, the AMF entity may, prior to acquiring the mapping, acquire the IDs of the EPS bearers that need to receive the forwarded data from an MME.

Prior to acquiring the IDs of the EPS bearers that need to receive the forwarded data from the MME, the AMF entity may further provide IDs of candidate EPS bearers that need to receive the forwarded data to the MME, so that the LTE network may determine the IDs of the EPS bearers that need to receive the forwarded data in accordance with the IDs of the candidate EPS bearers that need to receive the forwarded data.

During the implementation, in some possible embodiments of the present disclosure, an evolved Node B (eNB) in the LTE network may determine the IDs of the EPS bearers that need to receive the forwarded data in accordance with a mapping between the QoS flows for the PDU sessions for which the data needs to be forwarded and which is encapsulated by the NG RAN in a source 5G network in a transparent source-to-target container and the EPS bearers generated through mapping.

Prior to providing the IDs of the candidate EPS bearers that need to receive the forwarded data to the MME, the AMF further needs to determine the IDs of the candidate EPS bearers that need to receive the forwarded data. The determining, by the AMF entity, the IDs of the candidate EPS bearers that need to receive the forwarded data may include: acquiring the IDs of the QoS flows for the PDU sessions for which the data needs to be forwarded from the NG RAN of the 5G system; acquiring the mapping between the IDs of the QoS flows for the PDU sessions and the IDs of the EPS bearers from the PGW-C+SMG entity; and determining the IDs of the candidate EPS bearers that need to receive the forwarded data, corresponding to the IDs of the QoS flows for the PDU sessions for which the data needs to be forwarded in accordance with the mapping between the IDs of the QoS flows for the PDU sessions and the IDs of the EPS bearers.

In the embodiments of the present disclosure, when the mapping between the EPS bearer information and the PDU session information is the mapping among the IDs of the VDU sessions that need to receive the forwarded data, the IDs of the related QoS flows for the PDU sessions and the IDs of the EPS bearers, prior to acquiring the mapping, the AMP entity may acquire the IDs of the QoS flows for the PDU sessions that need to receive the forwarded data from the NG RAN of the 5G system.

Prior to acquiring the IDs of the QoS flows for the PDU sessions that need to receive the forwarded data from the NG RAN of the 5G system, the AMP entity may further provide the IDs of the QoS flows for the candidate PDU sessions that need to receive the forwarded, data to the NG RAN, so that the NG RAN may determine the ID of the QoS flow for the PDU session that needs to teethe the forwarded data in accordance with the IDs of the QoS flows for the candidate. PDU sessions that need to receive the forwarded data.

During the implementation, in some possible embodiments of the present disclosure, the NG RAN may determine the ID of the QoS flow for the PDU session that needs to receive the forwarded data in accordance with the EPS bearers that need to receive the forwarded data in accordance with the mapping between the EPS bearers for which the data needs to be forwarded and which is encapsulated by the NG RAN in the source 5G network in the transparent source-to-target container and the QoS flows for the PDU sessions generated through mapping.

Prior to providing the IDs of the QoS flows for the candidate PDU sessions that need to receive the forwarded data to the NG RAN, the AMF entity further needs to determine the IDs of the QoS flows for the candidate PDU sessions that need to receive the forwarded data. The determining, by the AMF entity, the IDs of the QoS flows for the candidate PDU sessions that receive the forwarded data may include: acquiring the IDs of the EPS bearers for which the data needs to be forwarded from the MME; and determining the IDs of the QoS flows for the candidate PDU sessions that need to receive the forwarded data in accordance with the IDs of the EPS beaters for which the data needs to be forwarded.

A data forwarding procedure will be described hereinafter in conjunction with FIGS. 2-6 and first to fifth embodiments.

First Embodiment

Figure 2:
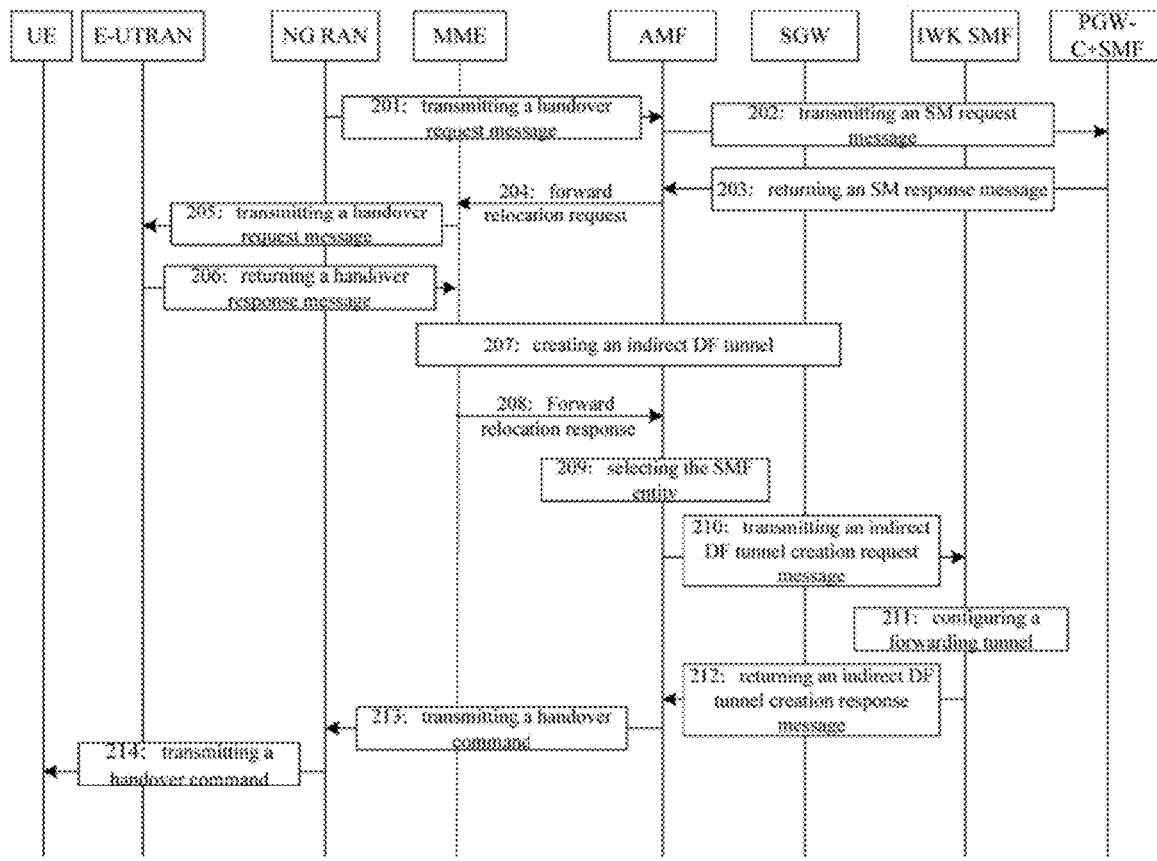
FIG. 2 is a schematic view showing a data forwarding procedure according to a first embodiment of the present disclosure.

FIG. 2 shows the data forwarding procedure according to the first embodiment of the present disclosure. In the first embodiment of the present disclosure, the data is forwarded from the 5G system to the LTE system, and the AMF entity is configured to request the creation of a forwarding tunnel. The data forwarding procedure may include the following steps.

Step 201: transmitting, by the NG RAN of the 5G system, a handover request message to the AMF entity. The handover request message may carry information about the QoS flows for the PDU sessions for which the data needs to be forwarded (or relayed), and the information may include the IDs of the QoS flows and the IDs of the PDU sessions to which the QoS flows belong.

Step 202: determining, by the AMF entity, the corresponding PGW-C+SMF entity in accordance with the IDs of the PDU sessions, and transmitting a Session Management (SM) request message to the PGW-C+SMF entity. The SM request message may carry the IDs of the QoS flows for the PDU sessions for which the data needs to be forwarded.

Step 203: determining, by the PGW-C+SMF entity, the mapping between the IDs of the QoS flows for the PDU sessions and the IDs of the EPS hearers in accordance with a mapping parameter of the EPS bearers and the QoS flows, determining an EPS bearer context corresponding to each QoS flow, and transmitting an SM response message to the AMF entity. The SM response message may carry the determined EPS bearer context.

Step 204: forwarding, by the AMP entity, the mapped EPS bearer context provided by the PGW-C+SMF entity to the MME through a forward relocation request message. The EPS bearer context may include the EPS bearer information about the EPS bearers that need to receive the forwarded data.

Step 205: transmitting, by the MME, as handover request message to a target eNB in the E-UTRAN in accordance with the received EPS bearer information. The handover request message may carry the EPS bearer information, e.g., the IDs of the EPS bearers.

Step 206: allocating, by the target, eNB, the TEID to a corresponding bearer in accordance with the EPS bearer information, and transmitting the TEID to the MME through a handover request ACK message.

Step 207: creating, by the MME, an indirect data forwarding tunnel with the SGW through an existing procedure, and allocating the TEID to the indirect data forwarding tunnel.

Step 208: transmitting, by the MME, a forward relocation response message to the AMF entity, so as to transmit the TEID allocated by the SGW for forwarding the data and the associated ID of the EPS bearer to the AMF entity.

Step 209: determining, by the AMF entity, the IWK SMF entity for forwarding the data for each PDU session in accordance with the position information about the UE.

Step 210: transmitting, by the AMF entity, an indirect. Data Forwarding (OF) tunnel creation request message to the determined SMF entity. The indirect DF tunnel creation request message may carry the mapping between the IDs of the EPS bearers that need to receive the forwarded data and the IDs of the QoS flows for the PDU sessions, and the EPS bearer context, e.g., the IDs of the EPS bearers, a SGW TEM corresponding to each EPS bearer and a QoS Flow Identity (QFI).

Step 211: selecting, by the SMF entity, the UPF entity, allocating a core network tunnel ID of an N3 interface for forwarding the data to each PDU session, creating an N3 PDU session tunnel between the UPF and the NG RAN, configuring a forwarding tunnel between the UPF and the SGW for forwarding the data in accordance with the SGW TEM corresponding to each EPS bearer, and binding the QoS flow to a forwarding tunnel corresponding to the EPS bearer in accordance with the mapping between the IDs of the EPS bearers and the IDs of the QoS flows for the PDU sessions, so that the UPF is capable of mapping a data packet to a correct forwarding tunnel in accordance with a QFI of the data packet.

Step 212: transmitting, by the SMF entity, an indirect DF tunnel creation response message to the AMP entity. The indirect DF tunnel creation response message may carry the core network tunnel ID of the N3 interface for forwarding the data.

Step 213: transmitting, by the AMP entity, a handover command (which may carry the core network tunnel ID of the N3 interface for forwarding the data) to the NG RAN, so as to forward the data cached in the NG RAN to the UPF, and enable the UPF to map the data packet to a correct forwarding tunnel in accordance with a QFI of a data packet header. The UPF may strip off the QFI of the data packet header, and forward the data to the SGW, i.e., the AMP entity may complete the subsequent handover procedure.

Step 214: transmitting, by the NG RAN, a handover command to the UE.

Second Embodiment

Figure 3:
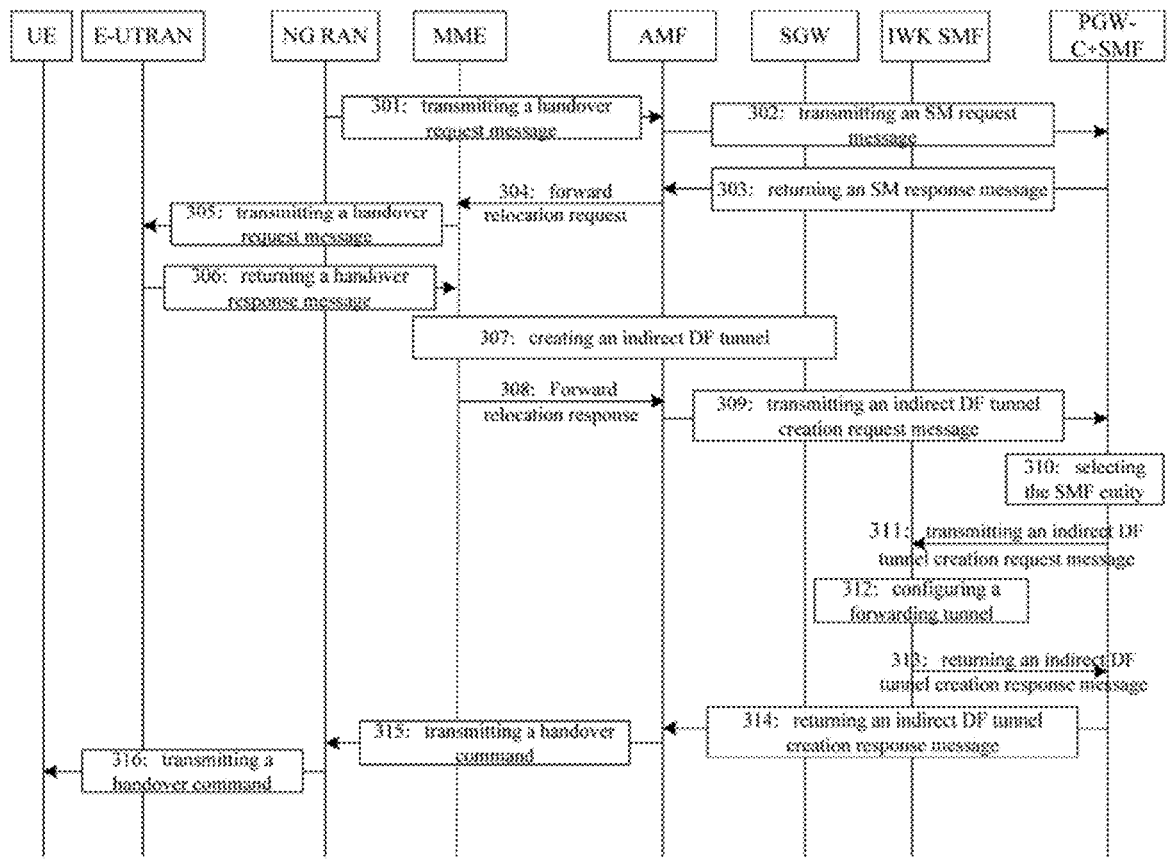
FIG. 3 is a schematic view showing the data forwarding procedure according to a second embodiment of the present disclosure.

FIG. 3 shows the data forwarding procedure according to the second embodiment of the present disclosure. In the second embodiment of the present disclosure, the data is forwarded from the 5G system to the LTE system, and the PGW-C+SMF entity is configured to request the creation of a forwarding tunnel. The data forwarding procedure may include the following steps.

Step 301: transmitting, by the NG RAN, a handover request message to the AMP entity. The handover request message may carry information about the QoS flows for the PDU sessions for which the data needs to be forwarded, and the information may include the IDs of the QoS flows and the IDs of the PDU sessions to which the QoS flows belong.

Step 302: determining, by the AMF entity, the corresponding PGW-C+SMF entity in accordance with the IDs of the PDU sessions, and transmitting SM request message to the PGW-C+SMF entity. The SM request message may carry the IDs of the QoS flows for the PDU sessions for which the data needs to be forwarded.

Step 303: determining, by the PGW-C+SMF entity, the mapping between the IDs of the QoS flows for the PDU sessions and the IDs of the EPS bearers in accordance with a mapping, parameter of the EPS bearers and the QoS flows, determining an EPS bearer context corresponding to each QoS flow, and transmitting an SM response message to the AMP entity. The SM response message may carry the determined EPS bearer context.

Step 304: forwarding, by the AMP entity, the mapped EPS bearer context provided by the PGW-C+SMF entity to the MME through a forward relocation request message. The EPS bearer context may include the EPS bearer information about the EPS bearers that need to receive the forwarded data.

Step 305: transmitting, by the MME, a handover request message to the target eNB in the E-UTRAN in accordance with the received EPS bearer information. The handover request message may carry the EPS bearer information, e.g., the IDs of the EPS bearers.

Step 306: allocating, by the target eNB, the TEID to a corresponding bearer in accordance with the EPS bearer information, and transmitting the TEID to the MME through a handover request ACK message.

Step 307: creating, by the MME, an indirect data forwarding tunnel with the SGW through an existing procedure, and allocating the TEID to the indirect data forwarding tunnel.

Step 308: transmitting by the MME, to forward relocation response message to the AMP entity, so as to transmit the TEID allocated by the SGW for forwarding the data and the associated ID of the EPS bearer to the AMF entity.

Step 309: transmitting, by the AMP entity, an indirect DF tunnel creation request message to the PGW-C+SMF entity in accordance with the received mapping between the IDs of the EPS bearers and the QoS flows of the PDU sessions. The indirect DF tunnel creation request message may carry the ID of the EPS bearer and the SGW TEID corresponding to the EPS bearer.

Step 310: determining, by the PGW-C+SMF entity, an intermediate SMF entity for forwarding the data for each PDU session in accordance with the position information about the UP.

Step 311: transmitting, by the PGW-C+SMF entity, an indirect DF tunnel creation request message to the determined intermediate SMF entity. The indirect DF tunnel creation request message may carry the mapping between the IDs of the EPS bearers that need to receive the forwarded data and the IDs of the QoS flows for the PDU sessions, and the SGW TEID corresponding to each EPS bearer.

Step 312: selecting, by the intermediate SMF entity, the UPF entity, allocating a core network tunnel ID of an N3 interface for forwarding the data to each PDU session, creating an N3 PDU session tunnel between the UPF and the NG RAN, configuring a forwarding tunnel between the UPF and the SGW for forwarding the data in accordance with the SGW TEM corresponding to each EPS bearer, and binding the QoS flow to a forwarding tunnel corresponding to the EPS bearer in accordance with the napping between the IDs of the EPS bearers and the IDs of the QoS flows for the PDU sessions, so that the UPF is capable of mapping a data packet to a correct forwarding tunnel in accordance with an ID of a QoS flow of the data packet.

Step 313: transmitting, by the intermediate SMF entity, an indirect OF tunnel creation response message to the PGW-C+SMF entity. The indirect DF tunnel creation response message may carry the core network tunnel ID of the N3 interface for forwarding the data.

Step 314: transmitting, by the PGW-C+SMF entity, an indirect DF tunnel creation response message to the AMF. The indirect DF tunnel creation response message may carry the core network tunnel ID of the N3 interface for forwarding the data.

Step 315: transmitting, by the AMF entity, a handover command (which may carry the core network tunnel ID of the N3 interface for forwarding the data) to the NG RAN, so as to forward the data cached in the NG RAN to the UPF, and enable the UPF to map the data packet to a correct forwarding tunnel in accordance with the QFI of the data packet. The UPF may strip off the QFI of the data packet header, and forward the data to the SGW, i.e., the AMF entity may complete the subsequent handover procedure.

Step 316: transmitting, by the NG RAN, a handover command to the UE.

In the first and second embodiments, the data may be forwarded from the 5G system to the LTE system. However, apart from this, the data may also be forwarded from the LTE system to the 5G system, which will be described hereinafter in third to fifth embodiments.

Third Embodiment

Figure 4:
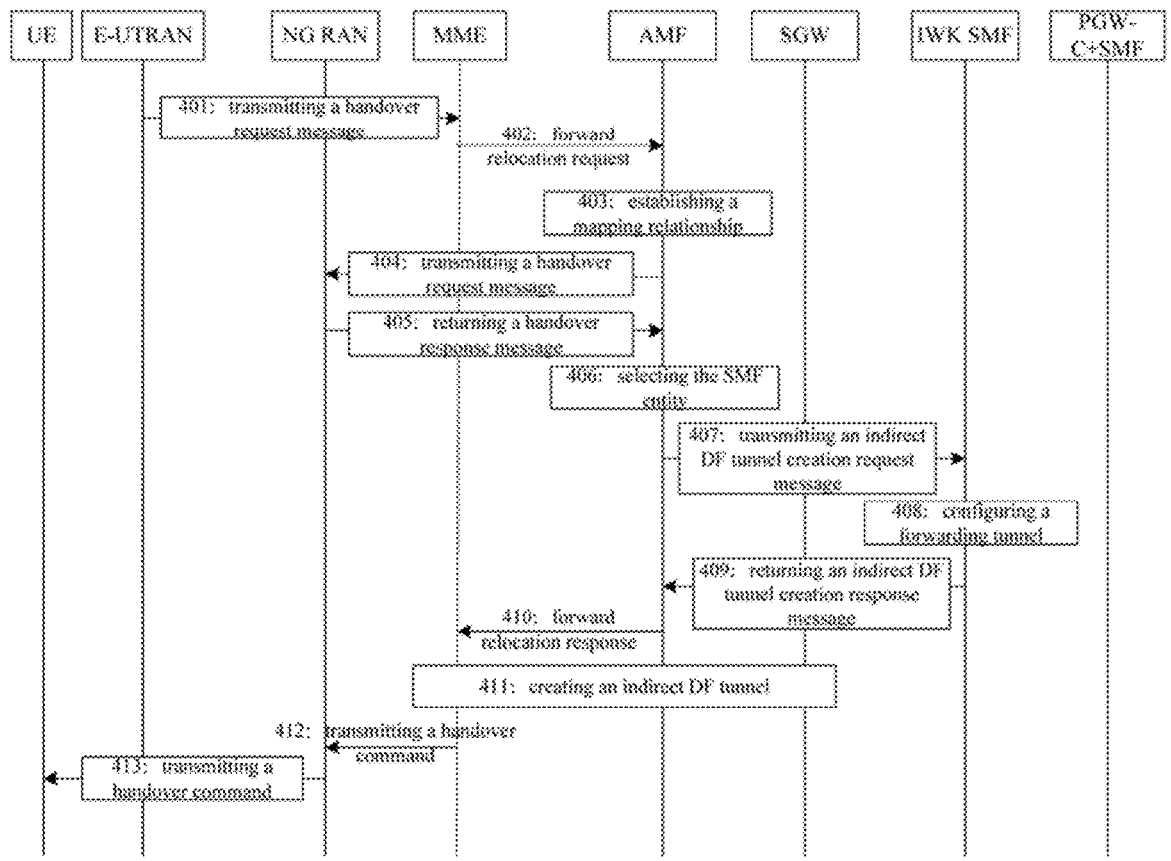
FIG. 4 is a schematic view showing the data forwarding procedure according to a third embodiment of the present disclosure.

FIG. 4 shows the data forwarding procedure according to the third embodiment of the present disclosure. In the third embodiment of the present disclosure, the data is forwarded from the LTE system to the 5G system, and the AMF entity is configured to locally perform a mapping operation between the EPS bears and the PDU sessions, and request the creation of a forwarding tunnel. The data forwarding procedure may include the following steps.

Step 401: transmitting, by the eNB in the E-UTRAN, at handover request message to the MME. The handover request message may carry the IDs of the EPS bearers for which the data needs to be forwarded.

Step 402: forwarding, by the MME, the EPS bearer context to the AMF entity through a forward relocation request message. The forward relocation request message may carry the EPS bearer information about the EPS bearers for which the data needs to be forwarded.

Step 403: mapping, by the AMF entity, an ID of a default bearer to, an ID of a VDU session and mapping IDs of all dedicated bearers to the IDs of the QoS flows in accordance with the received EPS bearer context, and determining the QoS flow contained in each PDU session.

Step 404: determining, by the AMF entity, the PDU session information about the PDU sessions that need to receive the forwarded data in accordance with the IDs of the EPS bearers for which the data needs to be forwarded and the mapping in Step 403, and forwarding the determined PDU, session information to a target NG RAN through a handover request message.

Step 405: allocating, by the target NG RAN, an access network tunnel of the N3 interface for forwarding the data to a corresponding PDU session in accordance with the received PDU session information, and transmitting the allocated access network tunnel to the AMF entity through a handover response message.

Step 406: determining, by the AMF entity, the SMF entity for forwarding the data for each PDU session that needs to receive the forwarded data in accordance with the information from the NG RAN. The AMF entity may determine the SMF entity in accordance with the position information about the UE.

Step 407: transmitting, by the AMF entity, an indirect DF tunnel creation request message to the SMF entity. The indirect DF tunnel creation request message, may carry the mapping between the UN of the EPS bearers and the IDs the QoS flows for the PDU sessions, the IDs of the EPS bearers, the QFI, and information about the access network tunnel of the N3 interface for forwarding the data corresponding to each PDU session.

Step 408: selecting, by the SMF entity, the UPF entity, allocating a GTP TEM of a GTP tunnel for forwarding the data to each EPS bearer, establishing an N3 PDU session tunnel between the UPF entity and the NG RAN, binding each EPS bearer to a forwarding tunnel corresponding to the PDU session, and establishing the mapping between the IDs of the PDU sessions and the IDs of the EPS bearers, so that the UPF entity is capable of marking a data packet received from the GTP tunnel corresponding to the EPS bearer with a correct ID of a QoS flow, and mapping the data packet to a correct PDU session forwarding tunnel.

Step 409: transmitting, by the SMF entity, an indirect DF tunnel creation response message to the AMF entity. The indirect DF tunnel creation response message may carry the allocated GTP TEID of the GTP tunnel for forwarding the data.

Step 410: transmitting, by the AMF entity, a forward relocation response message to the MME. The forward relocation response message may carry the GTP TEID.

Step 411; creating, by the MME, a forwarding tunnel with the SGW using a conventional process, i.e., transmitting art indirect DF tunnel creation request message to the SGW, and receiving an indirect DF tunnel creation response message from the SGW. The indirect DF tunnel creation request message may carry the GTP TEID.

Step 412: transmitting, by the MME, a handover command to the NO RAN. The handover command may carry a TEID of the SGW for forwarding the data, i.e., the MME may complete the subsequent handover procedure.

Step 413: transmitting, by the NG RAN, a handover command to, the UE.

Fourth Embodiment

Figure 5:
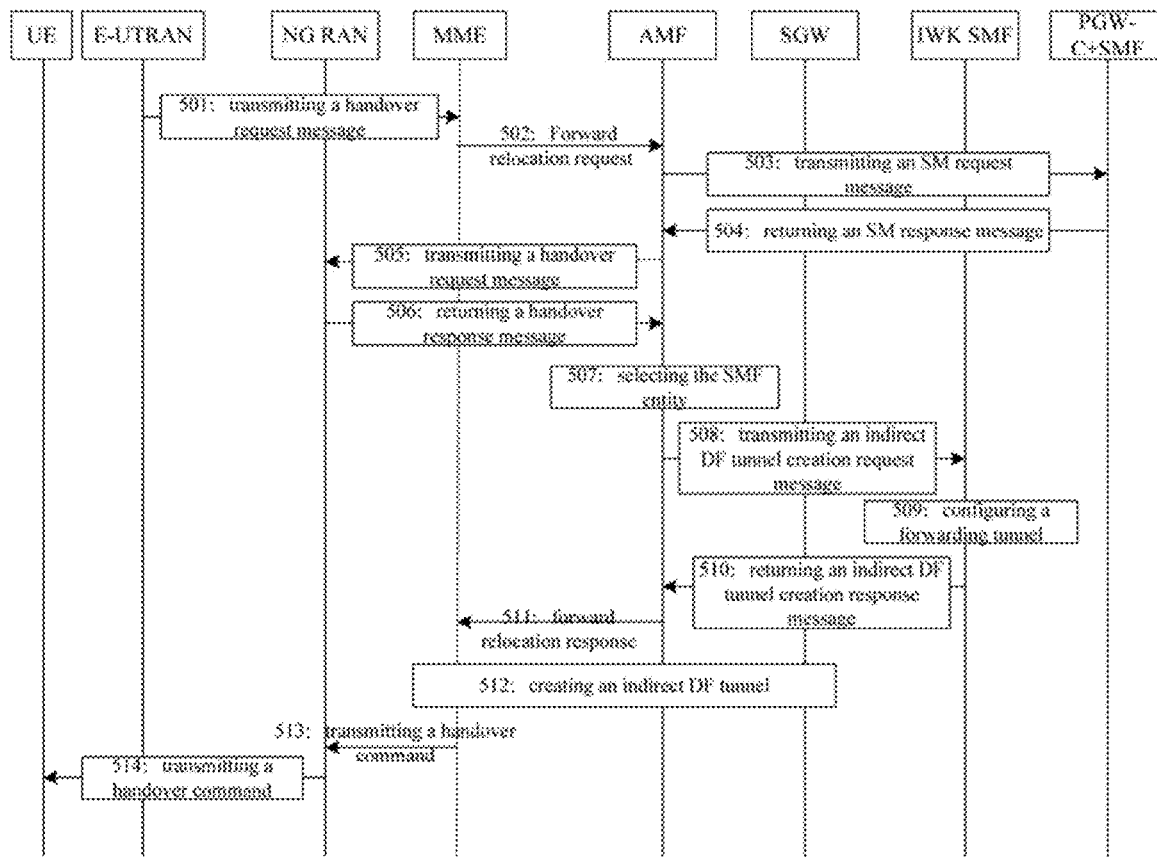
FIG. 5 is a schematic view showing the data forwarding procedure according to a fourth embodiment of the present disclosure.

FIG. 5 shows the data forwarding procedure according to the fourth embodiment of the present disclosure. In the fourth embodiment of the present disclosure, the data is forwarded from the LTE system to the 5G system, and the AMF entity is configured to request the creation of a forwarding tunnel. The data forwarding procedure may include the following steps.

Step 501: transmitting, by the eNB in the E-UTRAN, a handover request message to the MME. The handover request message may carry the IDs of the EPS bearers for which the data needs to be forwarded.

Step 502: forwarding, by the MME, the IDs of the EPS bearers to the AMF entity through a forward relocation request message.

Step 503: determining, by the AMF entity, the PGW-C+SMF entity serving the EPS bearers in accordance with the received IDs of the EPS bearers, and transmitting an SM request message to the PGW-C+SMF entity. The SM request message may carry the IDs of the EPS bearers.

Step 504: determining, by the PGW-C+SMF entity, the ID of the QoS flow mapped to each EPS bearer and the ID of the PDU session to which the QoS flow belongs in accordance with the mapping parameters of the EPS bearers and the QoS flows, and transmitting the determined ID of the QoS flow and the determined ID of the PDU session to the AMF entity through an SM response message.

Step 505: transmitting, by the AMF entity, a handover request message to the target NG RAN in accordance with the PDU session information from the SMF entity. The handover request message may carry the IDs of the PDU sessions.

Step 506: allocating, by the target NG RAN, an access network tunnel of an N3 interface for forwarding the data to a corresponding PDU session in accordance with the received PDU session information, and transmitting the allocated access network tunnel to the AMF entity through a handover response message.

Step 507: determining, by the AMF entity, the SMF entity for forwarding the data for each PDU session in accordance with the information from the NG RAN. The AMF entity may determine the SMF entity in accordance with the position information about the UE.

Step 508: transmitting, by the AMF entity, an indirect DF tunnel creation request message to the SMF entity. The indirect DF tunnel creation request message may carry mapping between the IDs of the EPS bearers and the IDs of the QoS flows for the PDU sessions, the IDs of the EPS bearers, the QFI, and information about the access network tunnel of the N3 interface for forwarding the data corresponding to each PDU session.

Step 509: selecting, by the SMF entity, the UPF entity, allocating a GTP TEID of a GTP tunnel for forwarding the data to each EPS bearer, establishing an N3 PDU session tunnel between the UPF entity and the NG RAN, binding the EPS bearer to a forwarding tunnel corresponding to the PDU session, and establishing the mapping between the IDs of the PDU sessions and the IDs of the EPS bearers, so that the UPF entity is capable of marking a data packet received from the GTP tunnel corresponding to the EPS bearer with a correct ID of the QoS flow, and mapping the data packet to a correct PDU session forwarding tunnel.

Step 510: transmitting, by the SMF entity, an indirect DF tunnel creation response message to the AMF entity. The indirect DF tunnel creation response message may carry the allocated GTP TEED of the GTP tunnel for forwarding the data.

Step 511: transmitting, by the AMF entity, a forward relocation response message to the MME. The forward relocation response message may carry the GTP TEID.

Step 512: creating, by the MME, a forwarding tunnel with the SGW using a conventional process, i.e., transmitting an indirect DF tunnel creation request message to the SGW, and receiving an indirect DF tunnel creation response message from the SGW The indirect DF tunnel creation request message may carry the GTP TEID.

Step 513: transmitting, by the MME, a handover command to the NG RAN. The handover command may carry the SGW TEED for forwarding the data, i.e., the MME may complete the subsequent handover procedure.

Step 514: transmitting, by the NG RAN, a handover command to the UE.

Fifth Embodiment

Figure 6:
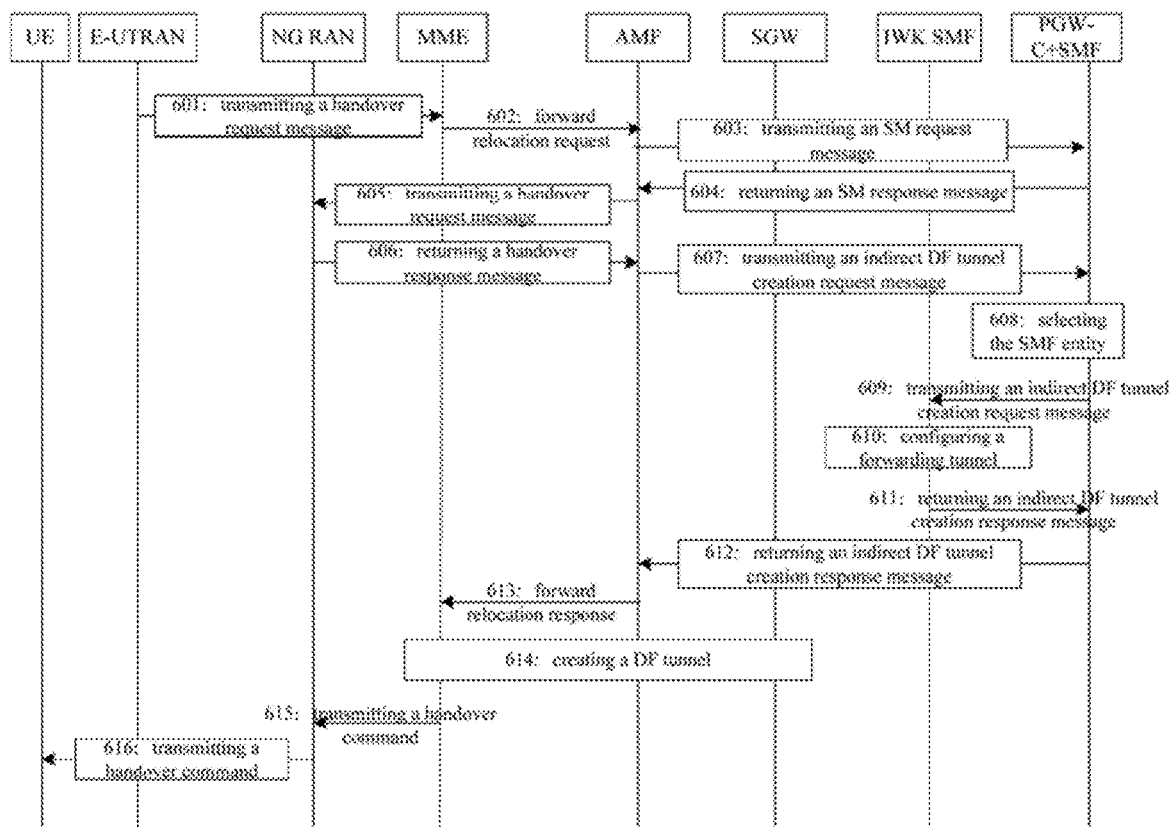
FIG. 6 is a schematic view showing the data forwarding procedure according to a fifth embodiment of the present disclosure.

FIG. 6 shows the data forwarding procedure according to the fifth embodiment of the present disclosure. In the fifth embodiment of the present disclosure, the data is forwarded from the ELF system to the 5G system, and the PGW-C+SMF entity is configured to request the creation of a forwarding tunnel. The data forwarding procedure may include the following steps.

Step 601: transmitting, by the eNB in the E-UTRAN, it handover request message to the MME. The handover request message may carry the IDs of the EPS bearers for which the data needs to be forwarded.

Step 602: forwarding, by the MME, the IDs of the EPS bearers to the AMF entity through a forward relocation request message.

Step 603: determining, by the AMF entity, the PGW-C+SMF entity serving the EPS bearers in accordance with the received IDs of the EPS bearers, and transmitting an SM request message to the PGW-C+SMF entity. The SM request message may carry the IDs of the EPS bearers.

Step 604: determining, by the PGW-C+SMF entity, the ID of the QoS flow mapped to each EPS bearer and the ID of the PDU session to which the QoS flow belongs in accordance with the mapping parameters of the EPS bearers and the QoS flows, and transmitting the determined ID of the QoS flow and the determined ID of the PDU session to the AMF entity through an SM response message.

Step 605: transmitting, by the AMF entity, a handover request message to the target NG RAN in accordance with the PDU session information from the SMF entity. The handover request message may carry the IDs of the PDU sessions.

Step 606: allocating, by the target NG RAN, an access network tunnel of an N3 interface for forwarding the data to each PDU session that needs to receive the forwarded data in accordance with the received PDU session information, and transmitting the allocated access network tunnel to the AMF entity through a handover response message.

Step 607: transmitting, by the AMP entity, an indirect DF tunnel creation request message to the PGW-C+SMF entity in accordance with the information from the NG RAN, so as to request the PGW-C+SMF entity to determine the SMF entity for forwarding the data. The indirect DF tunnel creation request message may carry the IDs of the EPS bearers, and information about the access network tunnel for forwarding the data corresponding to a PDU session corresponding to each EPS bearer.

Step 608: determining, by the PGW-C+SMF entity, the SMF entity for forwarding the data in accordance with the position information about the UE.

Step 609: transmitting, by the PGW-C+SMF entity, an indirect DF tunnel creation request message to the SMF entity. The indirect DF tunnel creation request message may carry the mapping between the IDs of the EPS bearers and the IDs of the QoS flows for the PDU sessions, the IDs of the EPS bearers, the QFI, and the information about the access network tunnel of the N3 interface for forwarding the data corresponding to each PDU session.

Step 610 selecting, by the SMF entity, the UPF entity, allocating a GTP TEID of a GTP tunnel for forwarding the data to each EPS bearer, establishing an N3 PDU session tunnel between the UPF entity and the NG RAN, binding the EPS bearer to a forwarding tunnel corresponding to the PDU session, and establishing the mapping between the IDs of the PDU sessions and the IDs of the EPS bearers, so that the UPF entity is capable of marking a data packet received from the GTP tunnel corresponding to the EPS bearer with a correct ID of the QoS flow, and mapping the data packet to a correct PDU session forwarding tunnel.

Step 611: transmitting, by the SMF entity, an indirect DF tunnel creation response message to the PGW-C+SMF entity. The indirect DF tunnel creation response message may carry the allocated GTP TEID of the GTP tunnel for forwarding the data.

Step 612: transmitting, by the PGW-C+SMF entity, an indirect OF tunnel creation response message to the AMF entity. The indirect DF tunnel creation response message may carry the allocated GTP TEID of the GTP tunnel for forwarding the data.

Step 613: transmitting, by the AMF entity, a forward relocation response message to the MME. The forward relocation response message may carry the GTP TEM.

Step 614: creating, by the MME, a forwarding tunnel with the SGW using a conventional process, i.e., transmitting an indirect DF tunnel creation request message to the SGW, and receiving an indirect DF tunnel creation response message from the SGW The indirect DF tunnel creation request message may carry the GTP TEID.

Step 615: transmitting, by the MME, a handover command to the NO RAN. The handover command may carry the SGW TEID for forwarding the data, i.e., the MME may complete the subsequent handover procedure.

Step 616: transmitting, by the NG RAN, a handover command to the UE.

Figure 7:
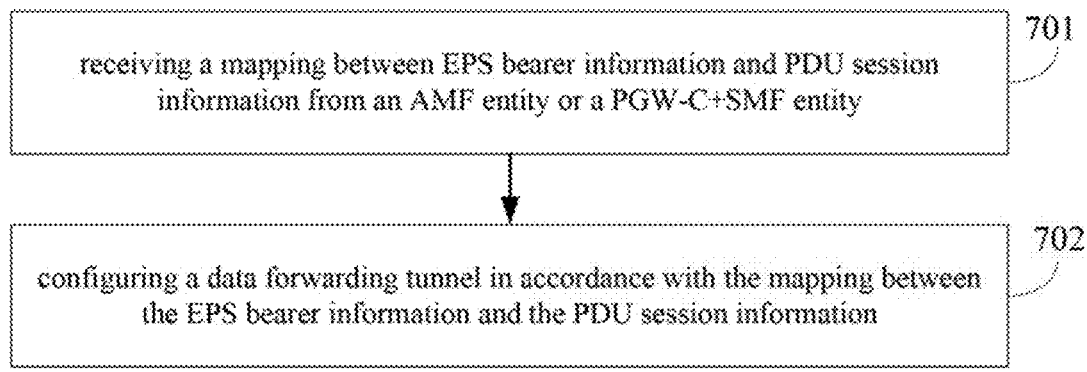
FIG. 7 is a flow chart of a data forwarding method according to some embodiments of the present disclosure.

As shown in FIG. 7, the present, disclosure further provides in some embodiments a data forwarding method for an SMF entity, which includes the following steps.

Step 701: receiving a mapping between EPS bearer information and PDU session information from art AMP entity or a PGW-C+SMF entity.

The data forwarding method in the embodiments of the present disclosure may be applied to an interoperating scenario with a 5G network and an LTE network. Data may be forwarded from a 5G system to an LTE system, or from the LTE system to the 5G system. When the data is forwarded from the 5G system to the LTE system, the mapping between the EPS bearer information and the PDU session information may be a mapping between IDs of EPS bearers that need to receive the forwarded data and IDs of QoS flows for PDU sessions. In addition, when the data is forwarded from the 5G system to the LTE system, the mapping between the EPS bearer information and the PDU session information may be a mapping among IDs of PDU sessions that need to receive the forwarded data, IDs of related QoS flows for the PDU sessions, and the IDs of the EPS bearers.

Step 702: configuring a data forwarding tunnel in accordance with the mapping between the EPS bearer information and the PDU session information.

When the mapping between the EPS bearer information and the PDU session information is the mapping between the IDs of the BPS bearers that need to receive the forwarded data and the IDs of the QoS flows for the PDU sessions, Step 702, i.e., the configuring the data forwarding tunnel, may include: selecting an UPF entity; allocating a core network tunnel ID for forwarding the data to a PDU session, and configuring a forwarding tunnel between the UPF entity and an SGW for forwarding the data and a PDU session tunnel between the UPF entity and an NG RAN of the 5G system; and binding a QoS flow for the PDU session to the forwarding tunnel corresponding to the EPS bearer that needs to receive the forwarded data, so that the LIRE entity is capable of forwarding a data packet to a correct EPS bearer forwarding tunnel in accordance with an ID of a QoS flow for the data packet.

When the mapping between the EPS bearer information and the VDU session information is the mapping among the IDs of the PDU sessions that need to receive the forwarded data, the IDs of the related QoS flows for the PDU sessions and the IDs of the EPS bearers, Step 702, i.e., the configuring the data forwarding tunnel, may include: selecting an UPF entity; allocating a TEID for forwarding the data to an EPS bearer, and configuring a PDU session tunnel between the UPF entity and the NG RAN of the 5G system; and binding the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

In this regard, according to the data forwarding method in the embodiments of the present disclosure, it is to prevent the occurrence of redundant forwarded data, while forwarding the data accurately, reduce the time delay for forwarding the data, and improve the data transmission efficiency.

The data forwarding methods have been described herein above, and corresponding data forwarding devices will be described hereinafter in conjunction with the drawings and embodiments.

Figure 8:
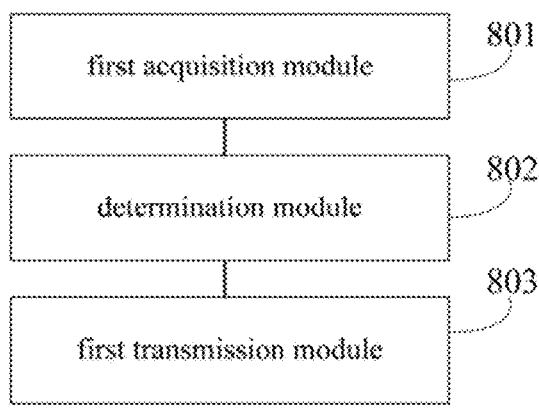
FIG. 8 is a schematic view showing a data forwarding device according to some embodiments of the present disclosure.

As shown in FIG. 8, the present disclosure further provides in some embodiments a data forwarding device for a network function entity, which includes: a first acquisition module 801 configured to acquire a mapping between EPS bearer information and PDU session information; a determination module 802 configured to determine an SMF entity for forwarding data; and a first transmission module 803 configured to transmit the mapping between the EPS bearer information and the PDU session information to the SW; entity, so that the SMF entity configures a data forwarding tunnel in accordance with the mapping between the EPS bearer information and the PDU session information.

According to the data forwarding device in the embodiments of the present disclosure, the mapping between the EPS bearer information and the PDU session information may be acquired, the SMF entity for forwarding the data may be determined, and then the mapping between the EPS bearer information and the PDU session information may be transmitted to the SMF entity, so that the SMF entity may configure the data forwarding tunnel in accordance with the mapping between the EPS bearer information and the PDU session information. As a result, it is able to prevent the use of a PGW-U+UPF entity as a data forwarding node, thereby to prevent the occurrence of redundant forwarded data, induce the time delay for forwarding the data, and improve the data transmission efficiency.

In some possible embodiments of the present disclosure, the network function entity may be an AMF entity or a PGW-U+UPF entity.

In some possible embodiments of the present disclosure, when the data is forwarded from a 5G system to an LTE system, the first acquisition module 801 is further configured to acquire a mapping between IDs of EPS bearers that need to receive the forwarded data and IDs of QoS flows for PDU Sessions.

Figure 9:
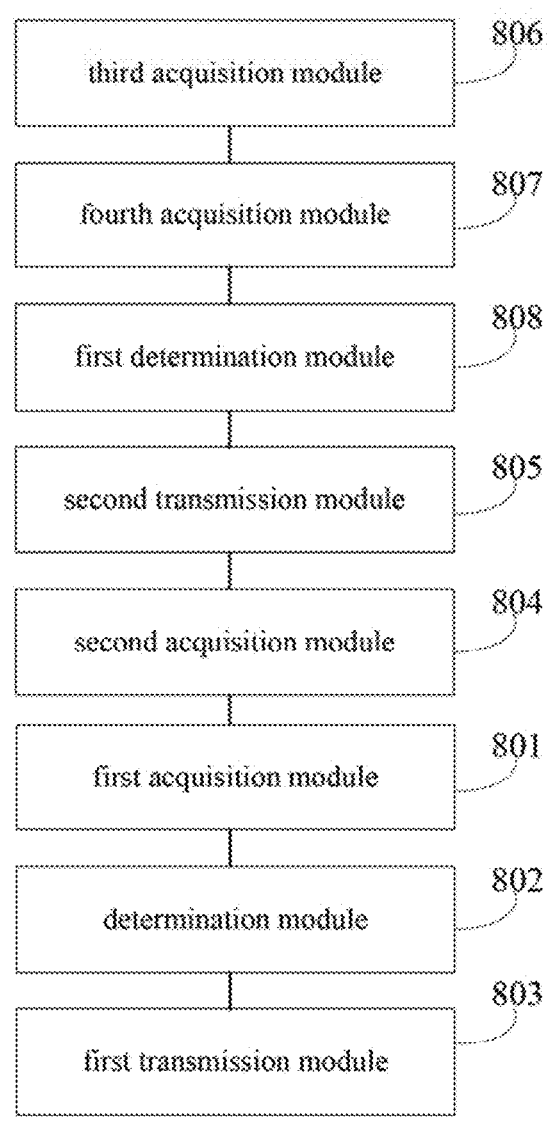
FIG. 9 is another schematic view showing the data forwarding device according to some embodiments of the present disclosure.

In some possible embodiments of the present disclosure, the network function entity may be an AMF entity, and as shown in FIG. 9, the data forwarding device may further include a second acquisition module 804 configured to acquire an ID of an EPS bearer that needs to receive the forwarded data from an MME.

In some possible embodiments of the present disclosure, as shown in FIG. 9, the data forwarding device may further include a second transmission module 805 configured to provide IDs of candidate EPS bearers that need to receive the forwarded data to the MME.

In some possible embodiments of the present disclosure, as shown, in FIG. 9, the data forwarding device may further include: a third acquisition module 806 configured to acquire an ID of a QoS flow for a PDU session for which the data needs to be forwarded from an NG RAN of the 5G system; a four acquisition module 807 configured to acquire the mapping between the IDs of the QoS flows for the PDU sessions and the IDs of the EPS bearers from the PGW-C+SMF entity; and a first determination module 808 configured to determine the IDs of the candidate EPS bearers that need to receive the forwarded data corresponding to the ID of the QoS flow for the PDU session for which the data needs to be forwarded in accordance with the mapping between the ifs of the QoS flows for the PDU sessions and the IDs of the EPS hearers.

In some possible embodiments of the present disclosure, when the data is forwarded from the LTE system to the 5G system, the first acquisition module 801 is further configured to acquire a mapping among IDs of the PDU sessions that need to receive the forwarded data, IDs of related QoS flows for the PDU session and the IDs of the EPS bearers.

Figure 10:
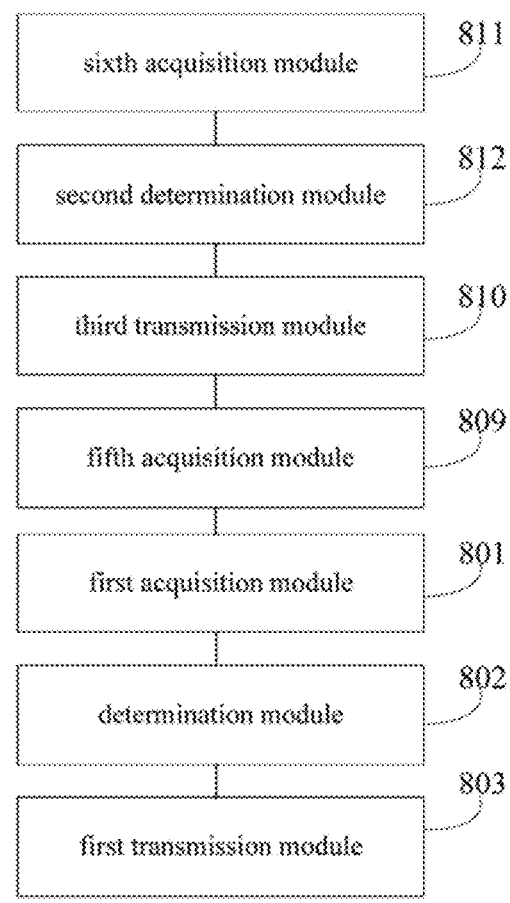
FIG. 10 is yet another schematic view showing the data forwarding device according to some embodiments of the present disclosure.

In some possible embodiments of the present disclosure, the network function entity may be an AMF entity, and as shown in FIG. 10, the data forwarding device may farther include a fifth acquisition module 809 configured to acquire the ID of the QoS flow for the PDU session that needs to receive the forwarded data from the NG RAN of the 5G system.

In some possible embodiments of the present: disclosure, as shown in FIG. 10, the data forwarding device may further include a third transmission module 810 configured to provide IDs of QoS flows for candidate PDU sessions that need to receive the forwarded data to the NG RAN.

In some possible embodiments of the present disclosure, as shown in FIG. 10, the data forwarding device may further include: a sixth acquisition module 811 configured to acquire the ID of the EPS bearer that needs to forward the data from the MME, and a second determination module 812 configured to determine the IDs of the QoS flows for the candidate PDU sessions that need to receive the forwarded data in accordance with the ID of the EPS bearer that needs to forward the data.

In some possible embodiments of the present disclosure, the determination module 802 is further configured to determine the SMF entity for forwarding the data in accordance with position information about a UE and/or PDU session information related to data forwarding. A PDU session related to data forwarding may be a PDU session for which the data needs to be forwarded, or a PDU session corresponding to the EPS bearer for which the data needs to be forwarded. The PDU session information may include at least one of a DNN corresponding to the PDU session and information about a network slice to which the PDU session belongs.

In some possible embodiments of the present disclosure, the network function entity may be a PGW-U+UPF entity, and the determination module 802 is further configured to: receive a request message from the ANTE entity, and determine the SMF entity for forwarding the data in accordance with the request message.

Figure 11:
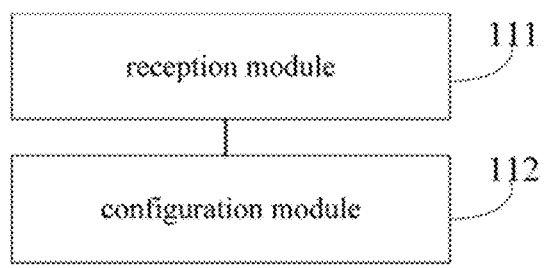
FIG. 11 is a schematic view showing a data forwarding device according to some embodiments of the present disclosure.

As shown in FIG. 11, the present disclosure further provides in some embodiments a data forwarding device for an SMF entity, which includes: a reception module 111 configured to receive a mapping between EPS bearer information and PDU session information from an AMF entity or a PGW-U+UPF entity; and a configuration module 112 configured to configure a data forwarding tunnel in accordance with the EPS bearer information and the PDU session information.

In some possible embodiments of the present disclosure, when data is forwarded from a 5G system to an LTE system, the mapping between the EPS bearer information and the PDU session information may be a mapping between IDs of EPS bearers that need to receive the forwarded data and IDs of QoS flows for PDU sessions. The configuration module 112 may include: a first selection unit configured to select an UPF entity; a first configuration unit configured to allocate a core network tunnel ID for forwarding the data to a PDU session, and configure a forwarding tunnel between the UPF entity and an SGW for forwarding the data and a PDU session tunnel between the UPF entity and an NG RAN of the 5G system; and a first binding unit configured to bind a QoS flow for the PDU session to the forwarding tunnel corresponding to the EPS bearer that needs to receive the forwarded data, so that the UPF entity is capable of forwarding a data packet to a correct EPS bearer forwarding tunnel in accordance with an ID of a QoS flow for the data packet.

In some possible embodiments of the present disclosure, when the data is forwarded from the LTE system to the 5G system, the mapping between the EPS bearer information and the PDU session information may be a mapping among IDs of the PDU sessions that need to receive the forwarded data, IDs of related QoS flows for the PDU sessions and the IDs of the EPS hearers. The configuration module 112 may include: a second selection unit configured to select an UPF entity; a second configuration unit configured to allocate a TED for forwarding the data to an EPS bearer, and configure a PDU session tunnel between the UPF entity and the NG RAN of the 5G system; and a second binding unit configured to bind the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

The present disclosure further provides in some embodiments a network function entity; which includes a memory, a processor, and a computer program stored in the memory and executed by the processor. The processor is configured to execute the computer program, so as to: acquire a mapping between EPS bearer information and PDU session information; determine an SMF entity for forwarding data, and transmit the mapping between the EPS bearer information and the PDU session information to the SMF entity, so that the SMF entity configures a data forwarding tunnel in accordance with the mapping between the EPS bearer information and the PDU session information.

The present disclosure further provides in some embodiments an SMF entity, which includes a memory, a processor, and a computer program stored in the memory and executed by the processor. The processor is configured to execute the computer program, so as to: receive a mapping between EPS bearer information and PDU session information from an AMF entity or a PGW-U+UPF entity; and configure a data forwarding tunnel in accordance with the EPS bearer information and the PDU session information.

Figure 12:
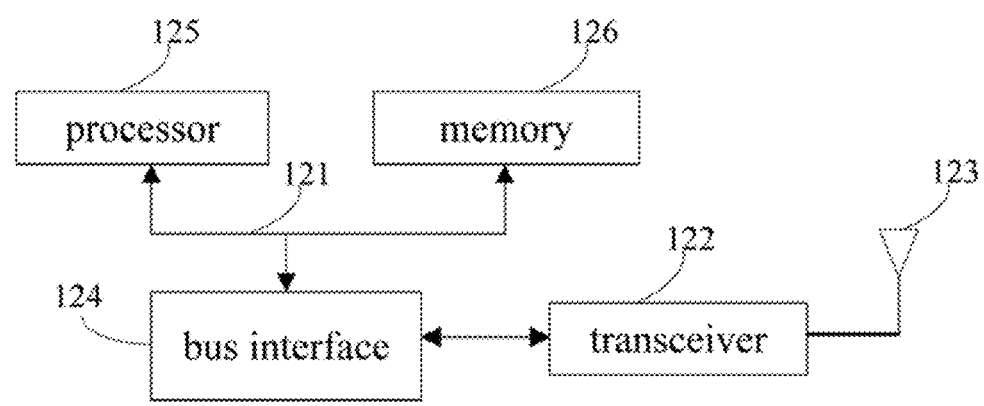
FIG. 12 is a schematic view showing a network function entity according to some embodiments of the present disclosure.

As shown in FIG. 12, the present disclosure further provides in some embodiments a network function entity which includes a bus 121, a transceiver 122, an antenna 123, a bus interface 124, a processor 125 and a memory 126.

The processor 125 is configured to read a program stored in the memory 126, so as to: acquire a mapping between EPS bearer information and PDU session information; determine an SMF entity for forwarding data; and transmit through the transceiver 122 the mapping between the EPS bearer information and the PDU session information to the SMF entity, so that the SMF entity configures a data forwarding tunnel in accordance with the mapping between the BPS bearer information and the PDU session information. The transceiver 127 is configured to receive and transmit data under the control oaf the processor 125.

In some possible embodiments of the present disclosure, the network function entity may be an AMF entity or a PGW-C+SMF entity.

In some possible embodiments of the present disclosure, when the data is forwarded from a 5G system to an LTE system, the processor 125 is further configured to acquire a mapping between IDs of EPS bearers that need to receive the forwarded data and IDs of QoS flows for PDU sessions.

In some possible embodiments of the present disclosure, the network function entity may be an AMP entity, and the processor 125 is further configured to acquire through the transceiver 122 an ID of an EPS bearer that needs to receive the forwarded data from an MME.

In some possible embodiments of the present disclosure, the processor 125 is further configured to provide through the transceiver 122 IDs of candidate EPS bearers that need to receive the forwarded data to the MME.

In some possible embodiments of the present disclosure, the processor 125 is further configured to: acquire through the transceiver 122 an ID of a QoS flow for a PDU session for which the data needs to be forwarded from an NG RAN of the 5G system; acquire the mapping between the IDs of the QoS flows for the PDU sessions and the IDs of the EPS bearers from the PGW-U+UPF entity; and determine the IDs of the candidate EPS bearers that need to receive the forwarded data corresponding to the ID of the QoS flow for the PDU session for which the data needs to be forwarded in accordance with the mapping between the IDs of the QoS flows for the PDU sessions and the IDs of the EPS bearers.

In some possible embodiments of the present disclosure, when the data is forwarded from the LTE system to the 5G system, the processor 125 is further configured to acquire a mapping among IDs of the PDU sessions that need to receive the forwarded data, IDs of related QoS flows for the PDU session and the IDs of the EPS bearers.

In some possible embodiments of the present disclosure, the network function entity may be an AMP entity, and the processor 125 is further configured to acquire through the transceiver 122 the ID of the QoS flow for the PDU session that needs to receive the forwarded data from the NG RAN of the 5G system.

In some possible embodiments of the present disclosure, the processor 125 is further configured to provide through the transceiver 122 IDs of QoS flows for candidate PDU sessions that need to receive the forwarded data to the NG RAN.

In some possible embodiments of the present disclosure, the processor 125 is further configured to acquire through the ID of the EPS bearer that needs to forward the data from the MME, and determine the IDs of the QoS flows for the candidate PDU sessions that need to receive the forwarded data in accordance with the ID of the EPS bearer that needs to forward the data.

In some possible embodiments of the present disclosure, the processor 125 is further configured to determine the SMF entity for forwarding the data in accordance with position information about a UE and/or PDU session information related to data forwarding. A PDU session related to data forwarding may be a PDU session for which the data needs to be forwarded, or a PDU session corresponding to the EPS bearer for which the data needs to be forwarded. The PDU session information may include at least one of a DNN corresponding to the PDU session and information about a network slice to which the PDU session belongs.

In some possible embodiments of the present disclosure, the network function entity may be a PGW-C+SMF entity, and the processor 125 is further configured to: receive through the transceiver 122 a request message from the AMF entity; and determine the SMF entity for forwarding, the data in accordance with the request message.

In addition, the network function entity in FIG. 12 may also be an SMF entity. When the network function entity in FIG. 12 is the SMF entity, the processor 125 is configured to read the computer program stored in the memory 126, so as to: receive through the transceiver 122 the mapping between the EPS bearer information and the PDU session information from the AMF entity or the PGW-U+UPF entity; and configure the data forwarding tunnel in accordance with the EPS bearer information and the PDU session information.

In some possible embodiments of the present disclosure, when the data is forwarded from the 5G system to the LTE system, the mapping between the EPS bearer information and the PDU session information may be a mapping between IDs of EPS bearers that need to receive the forwarded data and IDs of QoS flows for PDU sessions. The processor 125 is further configured to: select an UPF entity; allocate a core network tunnel ID for forwarding the data to a PDU session, and configure a forwarding tunnel between the UPF entity and the SGW for forwarding the data and a PDU session tunnel between the UPF entity and the NC RAN of the 5G system; and bind a QoS flow for the PDU session to the forwarding tunnel corresponding to the EPS bearer that needs to receive the forwarded data, so that the UPF entity is capable of forwarding a data packet to a correct EPS beater forwarding tunnel in accordance with an ID of a QoS flow for the data packet.

In some possible embodiments of the present disclosure, when the data is forwarded from the LTE system to the 5G system, the mapping between the EPS bearer information and the PDU session information may be a mapping among IDs of the PDU sessions that need to receive the forwarded data, IDs of related QoS flows for the PDU sessions and the IDs of the EPS bearers. The processor 125 is further configured to: select an UPF entity; allocate a TEID for forwarding the data to an EPS hearer, and configure a PDU session tunnel between the UPF entity and the NG RAN of the 5G system: and bind the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU, sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

In FIG. 12, bus architecture (represented by the bus 121) may include a number of buses and bridges connected to each other, so as to connect various circuits for one or more processors 125 and one or more memories 126, in addition, as is known in the art, the bus 121 may be used to connect any other circuits, such as a circuit for a peripheral device, a circuit for a voltage stabilizer and a power management circuit. The bus interface 124 may be provided between the bus 121 and the transceiver 122, and the transceiver 122 may consist of one or more elements, a plurality of transmitters and a plurality of receivers for communication with any other devices over a transmission medium. Data from the processor 125 may be transmitted over a wireless medium through an antenna 123. The antenna 123 may be further configured to, receive data and transmit the data to the processor 124. The processor 124 may take charge of managing the bus architecture as well as general processings, and may further provide various functions such as timing, peripheral interfacing, voltage adjustment, power source management and any other control functions. The memory 125 may store therein data desired for the operation of the processor 125.

In some possible embodiments of the present disclosure, the processor 125 may be a Central Processing Unit (CPU), an Application Specific Integrated Circuit (ASIC), a Field-Programmable Gate Array (FPGA) or a Complex Programmable Logic Device (CPLD).

The present disclosure further provides in some embodiments a computer-readable storage medium storing therein a computer program. The computer program is executed by a processor, so as to: acquire a mapping between. EPS bearer information and PDU session information; determine an SMF entity for forwarding data; and transmit the mapping between the EPS bearer information and the PDU session information to the SNIP entity, so that the SMF entity configures a data forwarding tunnel in accordance with the mapping between the EPS bearer information and the PDU session information.

In some possible embodiments of the present disclosure, the network function entity may be an AMP entity or a PGW-C+SMF entity.

In some possible embodiments of die present disclosure, when the data is forwarded from a 5G system to an LTE system, the computer program is further executed by the processor so as to acquire a mapping between IDs of EPS bearers that need to receive the forwarded data and IDs of QoS flows for PDU sessions.

In some possible embodiments of the present disclosure, the network function entity may be an AMF entity, and the computer program is further executed by the processor so as to acquire an ID of an EPS bearer that needs to receive the forwarded data from an MME.

In some possible embodiments of the present disclosure, the computer program is further executed by the processor so as to provide IDs of candidate EPS bearers that need to receive the forwarded data to the MME.

In some possible embodiments of the present disclosure, the computer program is further executed by the processor so as to: acquire an ID of a QoS flow for a PDU session for which the data needs to be forwarded from an NG RAN of the 5G system; acquire the mapping between the IDs of the QoS flows for the PDU sessions and the IDs of the EPS bearers from the PGW-C+SMF entity; and determine the IDs of the candidate EPS bearers that need to receive the forwarded data corresponding to the ID of the QoS flow for the VDU session for which the data needs to be forwarded in accordance with the mapping between the IDs of the QoS flows for the PDU sessions and the IDs of the EPS bearers.

In some possible embodiments of the present disclosure, when the data is forwarded from the LTE system to the 5G system, the computer program is further executed by the processor so as to acquire a mapping among IDs of the PDU sessions that need to receive the forwarded data, IDs of related QoS flows for the PDU session and the IDs of the EPS bearers.

In some possible embodiments of the present disclosure, the network function entity may be an AMF entity, and the computer program is further executed by the processor so as to acquire the ID of the QoS flow for the PDU session that needs to receive the forwarded data from the NG RAN of the 5G system.

In some possible embodiments of the present disclosure, the computer program is further executed by the processor so as to provide IDs of QoS flows for candidate EDU sessions that need to receive the forwarded data to the NG RAN.

In some possible embodiments of the present disclosure, the computer program is further executed by the processor so as to: acquire the ID of the EPS bearer that needs to forward the data from the MME; and determine the IDs of the QoS flows for the candidate PDU sessions that need to receive the forwarded data in accordance with the ID of the EPS bearer that needs to forward the data.

In some possible embodiments of the present disclosure, the computer program is further executed by the processor so as to determine the SMF entity for forwarding the data in accordance with position information about a UE and/or PDU session information related to data forwarding. A PDU session related to data forwarding may be a PDU session for which the data needs to be forwarded, or a PDU session corresponding to the EPS bearer for which the data needs to be forwarded. The PDU session information may include at least one of a DNN corresponding to the PDU session and information about a network slice to which the PDU session belongs.

In some possible embodiments of the present disclosure, the network function entity may be a PGW-C+SMF entity, and the computer program is further executed by the processor so as to: receive a request message from the AMF entity; and determine the SMF entity for forwarding the data in accordance with the request message.

The present disclosure further provides in some embodiments a computer-readable storage medium storing therein a computer program. The computer program is executed by a processor so as to: receive a mapping between EPS bearer information and PDU session information from an AMF entity or a PGW-C+SMF entity and configure a data forwarding tunnel in accordance with the EPS bearer information and the PDU session information.

In some possible embodiments of the present disclosure, when data is forwarded from a 5G system to an LTE system, the mapping between the EPS bearer information and the PDU session information may be a mapping between IDs of EPS bearers that need to receive the forwarded data and IDs of QoS flows for PDU sessions. The computer program is further executed by the processor so as to: select an UPF entity; allocate a core network tunnel ID for forwarding the data to a PDU session, and configure a forwarding tunnel between the UPF entity and an SGW for forwarding the data and a PDU session tunnel between the UPF entity and an NG RAN of the 5G system; and bind a QoS flow for the PDU session to the forwarding tunnel corresponding to the EPS bearer that needs to receive the forwarded data, so that the UPF entity is capable of forwarding a data packet to a correct EPS bearer forwarding tunnel in accordance with an ID of a QoS flow for the data packet.

In some possible embodiments of the present disclosure, when the data is forwarded from the UT system to the 5G system, the mapping between the EPS bearer information and the PDU session information may be a mapping among IDs of the PDU sessions that need to receive the forwarded data, IDs of related QoS flows for the PDU sessions and the IDs of the EPS bearers. The computer program is further executed by the processor so as to: select an UPF entity; allocate a TEED for forwarding the data to an EPS bearer, and configure a PDU session tunnel between the UPF entity and the NG RAN of the 5G system; and bind the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS hearers, so that the UPI entity is capable of marking a data packet received from a tunnel for the EPS bearer with an ID of a correct QoS flow, and forwarding the data packet to a correct PDU session forwarding tunnel.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), SRAM or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD), magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ,", it is not excluded that the procedure, method, article or device including the elements may also include any other identical elements.

It should be appreciated that, the relevant features in the above device may refer to each other. In addition, the serial number of the embodiments is for illustrative purposes only, and none of them is superior to the others.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data forwarding method for an SMF entity, comprising:
receiving a mapping between EPS bearer information and PDU session information from a PGW-C+SMF entity; and
configuring a data forwarding tunnel in accordance with the mapping between the EPS bearer information and the PDU session information,
wherein when data is forwarded from a 5G system to an LTE system, the mapping between the EPS bearer information and the PDU session information is a mapping between IDs of EPS bearers that need to receive the forwarded data and IDs of QoS flows for PDU sessions, wherein the configuring the data forwarding tunnel in accordance with the mapping between the EPS bearer information and the PDU session information comprises:
selecting an UPF entity;
allocating a core network tunnel ID for forwarding the data to a PDU session, and configuring a forwarding tunnel between the UPF entity and a Serving Gateway (SGW) for forwarding the data and a PDU session tunnel between the UPF entity and an NG RAN of the 5G system; and
binding a QoS flow for the PDU session to the forwarding tunnel corresponding to the EPS bearer that needs to receive the forwarded data, so that the UPF entity is capable of forwarding a data packet to a correct EPS bearer forwarding tunnel in accordance with an ID of a QoS flow for the data packet.

2. An SMF entity, comprising a memory, a processor, and a computer program stored in the memory and executed by the processor, wherein the processor is configured to execute the computer program so as to implement the data forwarding method according to claim 1.

3. A computer-readable storage medium storing therein a computer program, wherein the computer program is executed by a processor so as to implement the data forwarding method according to claim 1.

4. A data forwarding method for an SMF entity, comprising:
receiving a mapping between EPS bearer information and PDU session information from a PGW-C+SMF entity; and
configuring a data forwarding tunnel in accordance with the mapping between the EPS bearer information and the PDU session information,
wherein when the data is forwarded from an LTE system to a 5G system, the mapping between the EPS bearer information and the PDU session information is a mapping among IDs of the PDU sessions that need to receive the forwarded data, IDs of related QoS flows for the PDU sessions and the IDs of the EPS bearers, wherein the configuring the data forwarding tunnel in accordance with the mapping between the EPS bearer information and the PDU session information comprises:

selecting an UPF entity;

allocating a Tunnel Endpoint Identity (TEID) for forwarding the data to an EPS bearer, and configuring a PDU session tunnel between the UPF entity and the NG RAN of the 5G system; and binding the EPS bearer to a forwarding tunnel corresponding to the PDU session that needs to receive the forwarded data in accordance with the mapping among the IDs of the PDU sessions that need to receive the forwarded data, the IDs of the related QoS flows for the PDU sessions and the IDs of the EPS bearers, so that the UPF entity is capable of marking a data packet received from a tunnel for the EPS bearer with an ID of a correct QoS flow, and forwarding the data packet to a correct PDU session forwarding tunnel.

5. A computer-readable storage medium storing therein a computer program, wherein the computer program is executed by a processor so as to implement the data forwarding method according to claim 4.

6. An SMF entity, comprising a memory, a processor, and a computer program stored in the memory and executed by the processor, wherein the processor is configured to execute the computer program so as to implement the data forwarding method according to claim 4.

* * * * *